United States Patent
Cai

(10) Patent No.: US 6,828,405 B1
(45) Date of Patent: Dec. 7, 2004

(54) POLYIMINE/POLYISOCYANATE COATING COMPOSITION

(75) Inventor: Rubing Cai, Westmont, IL (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 08/448,019

(22) Filed: May 23, 1995

(51) Int. Cl.⁷ ............... C08G 18/10; C08G 18/32; C08G 18/60; C08L 75/00
(52) U.S. Cl. .......................................... 528/61; 528/64
(58) Field of Search ...................... 528/61, 64

(56) References Cited

U.S. PATENT DOCUMENTS

| | | | |
|---|---|---|---|
| 3,267,078 A | 8/1966 | Damusla .................. | 427/385.5 |
| 3,420,800 A | 1/1969 | Haggis ........................ | 528/59 |
| 3,553,118 A | 1/1971 | Brizgys ....................... | 528/52 |
| 3,567,692 A | 3/1971 | Haggis et al. ................ | 528/64 |
| 3,637,903 A | 1/1972 | Brizgys ....................... | 528/52 |
| 4,619,955 A | 10/1986 | Druetzler .................... | 524/29 |
| 4,847,319 A | 7/1989 | Bandlish ..................... | 524/589 |
| 4,866,103 A | 9/1989 | Cassidy et al. ............. | 521/159 |
| 5,087,661 A | 2/1992 | Aoki et al. .................. | 524/714 |
| 5,126,170 A | 6/1992 | Zwiener et al. ............. | 528/68 |
| 5,173,560 A | 12/1992 | Gras et al. ................... | 528/45 |
| 5,214,086 A | 5/1993 | Mormile et al. ............ | 524/237 |
| 5,227,243 A | 7/1993 | Shalati et al. ............... | 428/457 |
| 5,236,741 A | 8/1993 | Zwiener et al. ........... | 427/385.5 |
| 5,243,012 A | 9/1993 | Wicks et al. ................ | 528/58 |
| 5,360,642 A | 11/1994 | Chandalia et al. ....... | 427/385.5 |
| 5,412,056 A | 5/1995 | Zwiener et al. ............... | 528/73 |
| 5,466,771 A | 11/1995 | Hicks et al. .................. | 528/64 |

FOREIGN PATENT DOCUMENTS

| | | |
|---|---|---|
| EP | 164520 | 8/1987 |
| GB | 1110655 | 4/1968 |

OTHER PUBLICATIONS

Christian Zwiener, Lutz Schmalstieg and Michael Sonntag, *New Concepts For Two–Pack Polyurethane Coatings*, Euro-Coat Oct. 1992, pp. 588–600.

Dr. S. A. Jorissen, R. W. Rumer and Dr. D. A. Wicks, *Higher Solids Polyurethane Coatings*, Presented at the Water–borne & Higher Solids and Powder Coatings Symposium, Feb. 26–28, 1992.

M. Bock and R. Halpaap, *New Developments in Polyketimine–Polyisocyanate Coatings—Their Chemisrty and Applications*.

Primary Examiner—Patrick D. Niland
(74) Attorney, Agent, or Firm—Robert E. McDonald; Heidi A. Boehlefeld; Eryn Ace Fuhrer

(57) ABSTRACT

A coating composition having excellent cure at ambient conditions and comprising (i) at least one imine, (ii) a polyisocyanate having an average of at least two isocyanate groups per molecule, (iii) at least one polyaspartic ester, and (iv) an isocyanate functional urethane; wherein the coating composition is substantially free of hydroxy functionality. Coatings produced from the coating composition of this invention exhibit superior performance on flexible substrates.

1 Claim, No Drawings

POLYIMINE/POLYISOCYANATE COATING COMPOSITION

BACKGROUND OF THE INVENTION

The present invention relates to curable compositions having high solids and low VOC. These curable compositions are especially useful as coatings and may typically be used as primers, topcoats or as clearcoats and/or basecoats in clearcoat/basecoat compositions. These coating compositions are particularly useful as automotive refinish paint compositions. Most new automotive bumpers and some side panels are constructed from elastomeric plastics which can absorb impact shock and hence sustain body integrity. The high impact and chip resistance of these substrates require coatings having much higher impact resistance than conventional coatings. The present invention is directed to coating compositions which provide coatings having improved impact resistance.

In particular, this invention is directed to a coating composition providing extended pot life and excellent cure and consisting of the combination of (i) at least one imine having the structure

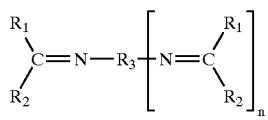

wherein n is 0 to 30, $R_1$ and $R_2$ are selected from the group consisting of hydrogen, alkyl, aryl, cycloaliphatic, and substituted alkyl, aryl, and cycloaliphatic groups; and $R_1$ and $R_2$ may be the same or different; and $R_3$ is selected from the group consisting of aliphatic, aromatic, arylaliphatic, and cycloaliphatic groups and which may also contain O, N, S, or Si; (ii) a polyisocyanate having an average of at least two isocyanate groups per molecule; (iii) at least one polyaspartic ester; (iv) an isocyanate functional urethane; wherein (ii) is different than (iv) and wherein the coating composition is substantially free of hydroxyl functionality.

Two-component curable mixtures comprising polyisocyanates and active hydrogen-containing compounds, such as polyols or polyamines, are well-known in the art to provide excellent performance and cure at low temperatures. However, due to the reactivity of the isocyanates and the active hydrogen-containing compounds, it is often difficult to obtain long pot-lives of the mixture of polyisocyanate and active hydrogen-containing material and yet still enjoy the benefits of rapid cure. This is especially true for low VOC materials, which will incorporate relatively low levels of solvent and will frequently involve low molecular weight, but highly reactive, starting materials.

Accordingly, it is an object of the present invention to provide a two component coating composition having extended pot-life and excellent cure. It is a further object of the present invention to provide an ambient cured coating composition having low VOC and relatively low viscosity. It is an even further object of the present invention to provide an ambient cured coating composition capable of providing a sufficiently flexible coating for curved or flexible substrates.

SUMMARY OF THE INVENTION

The present invention relates to a novel coating composition. The coating composition comprises:

(i) an imine having the structure

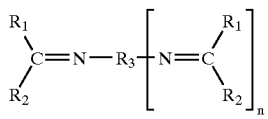

wherein n is 0 to 30,
$R_1$ and $R_2$ are selected from the group consisting of hydrogen, alkyl, aryl, cycloaliphatic, and substituted alkyl, aryl, and cycloaliphatic groups; and $R_1$ and $R_2$ may be the same or different; and
$R_3$ is selected from the group consisting of aliphatic, aromatic, arylaliphatic, and cycloaliphatic groups and which may also contain O, N, S, or Si;

(ii) a polyisocyanate having an average of at least two isocyanate groups per molecule;

(iii) at least one polyaspartic ester;

(iv) an isocyanate functional urethane; and wherein (ii) is different from (iv) and the coating composition is substantially free of hydroxyl groups. The isocyanate functional urethane comprises the reaction product of:

(a) an aliphatic polyisocyanate having an average of at least 2.1 isocyanate groups per molecule and selected from the group consisting of the biurets and isocyanurates of linear aliphatic diisocyanates; and (b) at least one monofunctional alcohol having a molecular weight less than about 500 and which is selected from the group consisting of:

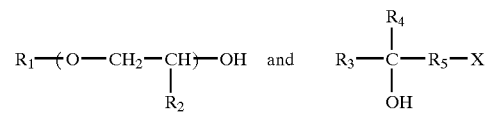

wherein n is from 1 to about 10; $R_1$ is an aliphatic radical of 1 to about 12 carbons; $R_2$ is H or $CH_3$; $R_3$ and $R_4$ are independently aliphatic of 1 to about 12 carbons or H; $R_5$ is an aliphatic radical of 1 to about 8 carbons or nothing; X is

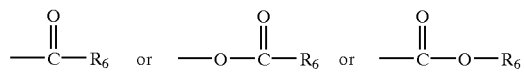

and $R_6$ is an aliphatic radical of 1 to about 12 carbons, and (c) at least one diol having the formula:

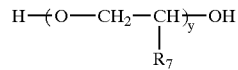

wherein $R_7$ is H or $CH_3$ and y is from 1 to about 40; wherein the total NCO/OH equivalents ratio is greater than 1.0 and the ratio or OH equivalents from (b) to OH equivalents from (c) ranges from 0.3:1 to 2.0:1.0.

DETAILED DESCRIPTION OF THE INVENTION

The reactivity of primary polyamines toward polyisocyanates is so great that it is difficult to process and apply coatings based on primary polyamine/polyisocyanate, even with sophisticated two-component equipment. However, by blocking the free amino groups of primary polyamines with ketones or aldehydes to form ketimines or aldimines, respectively, the reactivity toward isocyanates can be controlled. The present invention is directed to a curable coating composition which is substantially free of hydroxyl groups and which comprises an aldimine or ketimine, at least one polyaspartic ester, a polyisocyanate having an average of at least two isocyanate groups per molecule, and an isocyanate functional urethane.

1. Imine Compounds

The imine compounds which are useful in the present invention may be represented by the formula:

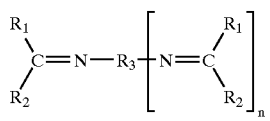

wherein n is 0 to 30, and preferably n is 0 to 5; $R_1$ and $R_2$ are hydrogen, an alkyl, aryl, cycloaliphatic, or substituted alkyl, aryl, or cycloaliphatic group; and $R_1$ and $R_2$ may be the same or different; and $R_3$ is an aliphatic, aromatic, arylaliphatic or cycloaliphatic group which may also contain O, N, S, or Si.

These imine compounds are prepared by the reaction of certain carbonyl compounds such as aldehydes and ketones with amines. Representative carbonyl compounds which may be used to form the imine include ketones such as acetone, methyl ethyl ketone, methyl isopropyl ketone, methyl isobutyl ketone, diethyl ketone, benzyl methylketone, diisopropyl ketone, cyclopentanone, and cyclohexanone, and aldehydes such as acetaldehyde, formaldehyde, propionaldehyde, isobutyraldehyde, n-butyraldehyde, heptaldehyde and cyclohexyl aldehyde. Representative amines which may be used to form the imine include ethylene diamine, propylene diamine, tetramethylene diamine, 2-methyl-1,5-diaminopentane, hexamethylene diamine and cycloaliphatic diamines such as those having the following structures:

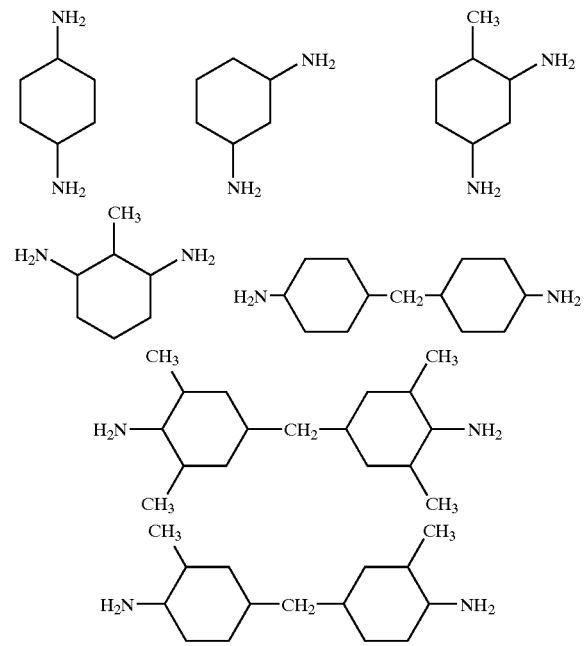

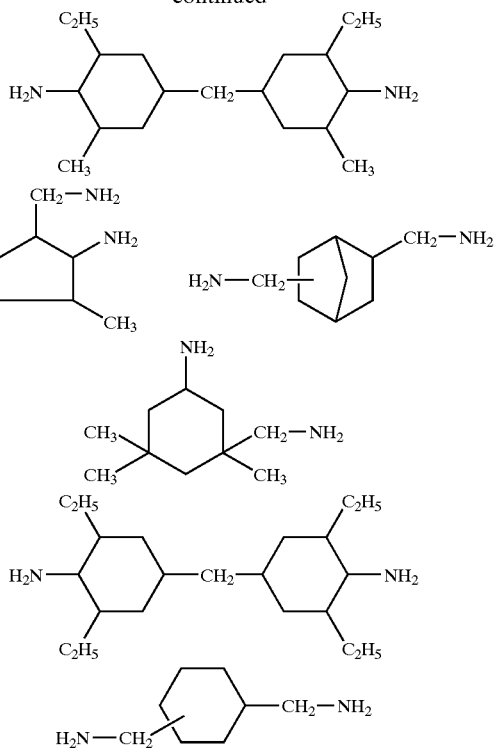

A preferred imine for the present invention is the reaction product of 2 moles of isobutyraldehyde and one mole of isophorone diamine and has the following structure:

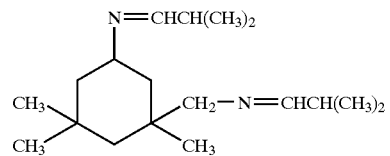

The chemical basis for the imine/polyisocyanate systems of the present invention is a molecular rearrangement to form a reactive species and/or the splitting of the ketimine or aldimine (reversing the reactions by which it is formed) into a ketone or aldehyde, respectively, and an amine by the reaction of the ketimine or aldimine with atmospheric moisture. This reaction is primarily responsible for the curing of the coating.

2. Polyisocyanate Compounds

Polyisocyanates useful in the compositions of this invention have an average of at least two isocyanates per molecule. Representative polyisocyanates useful in the present invention include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanatomethyl-3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4-diphenyl, 1,5-naphthalene and 1,4-naphthalene diisocyanates; the aliphatic-aromatic compounds such as 4,4-diphenylene methane, 2,4- or 2,6-toluene or mixtures thereof, 4,4'-toluidine, and 1,4-xylylene diisocyanates; the nuclear substituted aromatic compounds such as dianisdine diisocyanate, 4,4'-diphenylether diisocyanate and chlorodiphenylene diisocyanate; the triisocyanates such as triphenyl methane-4,4',4"-triisocyanate, 1,3,5-triisocyanatebenzene and 2,4,6-triisocyanate toluene; and the tetraisocyanates such as 4,4'-diphenyl-dimethyl methane-2,2'5,5'-tetraisocyanate; the polymerized polyisocyanates such as dimers and trimers, and other various polyisocyanates containing biuret, urethane, and/or allophanate linkages. Preferred polyisocyanates include dimers and trimers of hexamethylene diisocyanate and mixtures thereof.

3. Polyaspartic Ester Compounds

The polyaspartic ester of the present invention is reactive with the polyisocyanate and functions as a reactive diluent. The addition of at least one polyaspartic ester reduces viscosity build-up without adversely effecting the dry time of the coating composition. In addition, the polyaspartic ester provides excellent weathering resistance and durability to the curted coating. Particularly useful polyaspartic esters include those having the formula:

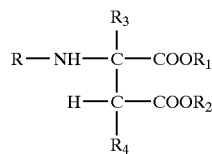

wherein R is an organic group which has a valency of n and is inert towards isocyanate groups, $R_1$ and $R_2$ may be identical or different and represent organic groups which are inert towards isocyanate groups, and $R_3$ and $R_4$ may be identical or different and represent hydrogen or organic groups which are inert towards isocyanate groups, and n is an integer with a value of at least 2. Such polyaspartic esters are taught in U.S. Pat. No. 5,126,170, which is hereby incorporated by reference. Preferred polyaspartic esters include the following:

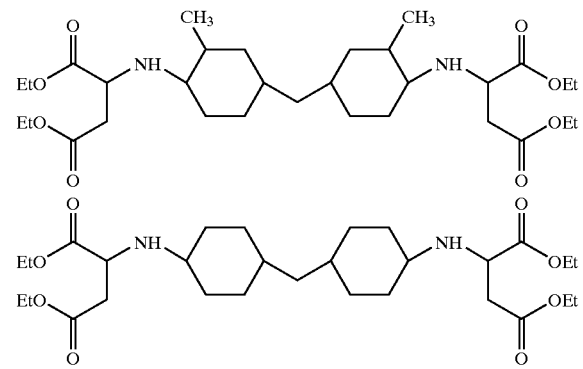

available from Miles as Desmophen XP-7053 and Desmophen XP-7068, respectively.

4. Isocyanate Functional Urethanes

Isocyanate functional urethanes useful in the present invention include the reaction product of:

(a) an aliphatic polyisocyanate having an average of at least 2.1 isocyanate groups per molecule and selected from the group consisting of the biurets and isocyanurates of linear aliphatic diisocyanates; and (b) at least one monofunctional alcohol having a molecular weight less than about 500 and which is selected from the group consisting of:

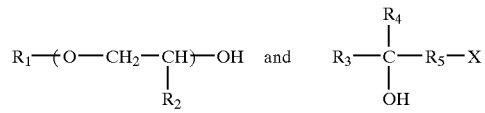

wherein n is from 1 to about 10; $R_1$ is an aliphatic radical of 1 to about 12 carbons; $R_2$ is H or $CH_3$; $R_3$ and $R_4$ are independently aliphatic of 1 to about 12 carbons or H; $R_5$ is an aliphatic radical of 1 to about 8 carbons or nothing; X is

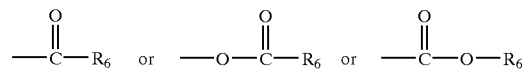

and $R_6$ is an aliphatic radical of 1 to about 12 carbons, and
 (c) at least one diol having the formula:

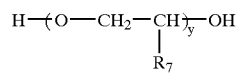

wherein $R_7$ is H or $CH_3$ and y is from 1 to about 40; wherein the total NCO/OH equivalents ratio is greater than 1.0 and the ratio of OH equivalents from (b) to OH equivalents from (c) ranges from 0.3:1 to 2.0:1.0, and preferably ranges from 0.5:1 to 2.0 to 1. Especially preferred is a ratio between 1.0:1 and 2.0 to 1. Such isocyanate functional urethanes are described in U.S. Pat. No. 4,619,955, the teaching of which is hereby incorporated by reference. A particularly preferred isocyanate functional urethane comprises the reaction product of isocyanurate of hexamethylene diisocyanate, 2-butoxy ethanol and Niax polyol PPG-725 (polypropylene glycol product commercially available from Union Carbide having an average hydroxyl number of 147).

Typically, the coating composition of the present invention comprises 1–40 percent by weight of the imine compound described above, 15–55 percent by weight of a polyisocyanate having an average of at least two isocyanate groups per molecule, 1–50 percent by weight of a polyaspartic ester and 1–20 percent by weight of an isocyanate functional urethane as described above. Preferably, the coating composition of the present invention comprises 5–15 percent by weight of the imine compound described above, 25–35 percent by weight of a polyisocyanate having an average of at least two isocyanate groups per molecule, 20–30 percent by weight of a polyaspartic ester and 5–15 percent by weight of an isocyanate functional urethane as described above.

Typically, the coating composition will include other additives to adjust the performance and application characteristics of the coating. Normally, the coating composition will include an inert organic solvent ranging from 1.0–90%, and preferably 1.0–50% by weight based upon the total weight of the coating. Useful inert organic solvents for the coating composition include aromatic hydrocarbons such as toluene, xylene, ethyl benzene, aromatic naphtha, etc.; aliphatic hydrocarbons such as mineral spirits, hexane, aliphatic naphtha, etc.; esters such as butyl acetate, ethylene glycol monoethyl ether acetate, ethylene glycol monobutyl ether acetate, etc.; and ketones such as methyl amyl ketone and methyl isobutyl ketone.

The coating composition of the present invention preferably contains a catalyst for the imine/isocyanate reaction. Anhydrides have been found to be particularly useful catalysts. Representative anhydrides include succinic anhydride, acetic anhydride, maleic anhydride, tetrahydrophthalic anhydride and hexahydrophthalic anhydride, and anhydride functional polymers. Anhydride functional polymers include those prepared by polymerizing an unsaturated monomer having anhydride functionality such as maleic anhydride, citraconic anhydride, itaconic anhydride, propenyl succinic anhydride, etc. with other ethylenically unsaturated monomers such as the esters of unsaturated acids, vinyl compounds, styrene-based materials, allyl compounds and other copolymerizable monomers. A preferred unsaturated monomer having anhydride functionality is maleic anhydride. Specific examples of polymeric anydrides are taught in U.S. Pat. No. 5,227,243, which is incorporated herein by reference.

The coating may also contain other additives such as flow agents, catalysts, diluents, ultraviolet light absorbers and stabilizers, etc.

The coatings of this invention may typically be applied to any substrate such as metal, plastic, wood, glass, synthetic fibers, etc, by brushing, dipping, roll coating, flow coating, spraying or other method conventially employed in the coating industry. The coatings produced from the composition of the present are particularly useful when applied to flexible substrates. If desired, the substrates may be primed prior to application of the coatings of this invention.

One preferred application of the curable compositions of this invention relates to their use as clearcoats and/or basecoats in clearcoat/basecoat formulations. Low VOC clearcoats are an especially useful application of this invention.

Clearcoat/basecoat systems are well known, especially in the automobile industry where it is especially useful to apply a pigmented basecoat, which may contain metallic pigments, to a substrate and allow it to form a film followed by the application of a clearcoat. The basecoat composition may be any of the polymers known to be useful in coating compositions including the reactive compositions of this invention.

Typically the basecoat will include pigments conventially used for coating compositions and after being applied to a substrate, which may or may not previously have been primed, the basecoat will be allowed sufficient time to form a polymer film which will not be lifted during the application of the clearcoat. The basecoat may be heated or merely allowed to air-dry to form the film. Generally, the basecoat will be allowed to dry for about 1 to 20 minutes before application of the clearcoat. The clearcoat is then applied to the surface of the basecoat, and the system can be allowed to dry at room temperature or, if desired, can be force dried by baking the coated substrate at temperatures typically ranging up to about 350° F.

Typically, the clearcoat may contain ultraviolet light absorbers such as hindered amines at a level ranging up to about 6% by weight of the vehicle solids as is well known in the art. The clearcoat can be applied by any application method known in the art, but preferably will be spray applied. If desired, multiple layers of basecoat and/or clearcoat can be applied. Typically, both the basecoat and the clearcoat will each be applied to give a dry film thickness of about 0.2 to about 6, and especially about 0.5 to about 3.0, mils.

The following examples are intended to illustrate the invention, unless otherwise stated, "parts" means parts-by-weight and "percent" means percent-by-weight.

EXAMPLE A

Isocyanate Functional Urethane

A reaction vessel equipped with stirrer, thermometer and nitrogen purge was charged with 380.18 parts toluene, 107.94 parts Niax polyol PPG-725 (polypropylene glycol product commercially available from Union Carbide having an average hydroxyl number of 147), 277.47 parts Desmodur N 3390 (90% solids in butyl acetate/aromatic naptha having an isocyanate equivalent weight of approximately 216), 50.38 parts ethylene glycol monobutyl ether and 0.03 parts dibutyl tin dilaurate. The reaction mixture was maintained under a nitrogen blanket and gradually heated over a period about 3 hours to 150° F. The reaction was maintained at that temperature for an additional 2 hours yielding an isocyanate functional urethane product having an NVM of about 50%.

EXAMPLE B

Imine Solution

An imine solution was prepared according to the following recipe:

| Raw Material | Parts |
| --- | --- |
| Aldimine[1] | 153.69 |
| Desmophen LS2973 hindered amine[2] | 461.00 |
| Desmophen XP7053 hindered amine | 153.58 |
| Byk 370[3] | 2.10 |
| Tinuvin 384[4] | 43.97 |
| Tinuvin 292[5] | 14.97 |
| n-butyl acetate | 11.25 |

[1]Reaction product of 1 mole of isophorone diamine and 2 moles of isobutyraldehyde.
[2]Hindered amine Desmophen XP7068 at 90% in n-butyl acetate available from Miles.
[3]Flow control agent sold by Byk-Malinkrodt.
[4]UV absorber from Ciba-Geigy.
[5]Light stabilizer from Ciba-Geigy.

EXAMPLE C

Isocyanate Solution

An isocyanate solution was prepared according to the following recipe:

| Raw Material | Parts |
| --- | --- |
| TOLONATE HDT100 LV[6] | 707.88 |
| n-butyl acetate | 33.54 |
| methyl isobutyl ketone | 143.92 |

[6]Trimer of hexamethylene diisocyanate from Rhone-Poulenc.

EXAMPLE D

Reducer Solution

A reducer solution was prepared according to the following recipe:

| Raw Material | Parts |
| --- | --- |
| BYKETOL OK[7] | 63.42 |
| methyl n-amyl ketone | 60.56 |
| methyl isobutyl ketone | 543.42 |
| succinic anhydride | 3.05 |

[7]Flow control agent from Byk-Malinkrodt.

EXAMPLE E

Reducer Solution

A reducer solution was prepared according to the following recipe:

| Raw Material | Parts |
| --- | --- |
| methyl isobutyl ketone | 660.79 |
| succinic anhydride | 6.06 |

EXAMPLE F

Reducer Solution

A reducer solution was prepared according to the following recipe:

| Raw Material | Parts |
|---|---|
| BYKETOL OK | 127.52 |
| methyl n-amyl ketone | 121.79 |
| methyl isobutyl ketone | 424.78 |

The isocyanate functional urethane, imine solution, isocyanate solution and the reducer solution of Example D were combined to produce the coating compositions of Examples 1–4 shown in Table I.

TABLE I

| | Raw Material by Weight | | | | |
|---|---|---|---|---|---|
| Example | Imine Solution | Isocyanate Solution | Reducer Solution | NCO Functional Urethane | VOC (lb/gal) |
| 1 | 25.2 | 26.1 | 6.7 | 8.2 | 2.4 |
| 2 | 25.2 | 26.1 | 6.7 | 16.4 | 2.6 |
| 3 | 33.6 | 8.7 | 13.4 | 8.2 | 2.2 |
| 4 | 25.2 | 26.1 | 6.7 | 0 | 2.1 |

The compositions Examples 1–4 were spray applied to Q-steel panels which had been coated with a etching filler (E2G980 GBP® commercially available from The Sherwin-Williams Company), a sealer (E6H59, commercially available from The Sherwin-Williams Company) and a basecoat (ULTRA 7000® commercially available from the Sherwin-Williams Company). The compositions were ambient cured to produce clear coatings having the performance characteristics shown in Table II. The ambient conditions during curing of these compositions were 75° F. and 30% humidity.

TABLE II

| | Example 1 | Example 2 | Example 3 | Example 4 |
|---|---|---|---|---|
| Gloss 20°[a] | 85 | 86 | 85 | 86 |
| Gloss 60°[a] | 92 | 92 | 92 | 92 |
| DOI[a] | 99 | 99 | 95 | 99 |
| KPH | 44 | 45 | 25 | 72 |
| MEK Rub Resistance | 9.5 | 9.5 | 9.5 | 9.0 |
| MEK Drop Test | fine craze | fine pinhole | no effect | no effect |
| Impact[b] (lb • in) | 110 | 110 | 150+ | 70 |
| Mandrel Bend[c] | pass | pass | pass | fail |
| Gravel Test[d] | 6 | 7 | 10 | 1 |
| Film Thickness (mil) | 2.1 | 2.4 | 2.3 | 2.2 |

[a]ASTM E430-91
[b]ASTM G14-88
[c]ASTM D522-93a
[d]ASTM D3170-87

While this invention has been described with respect to a number of specific embodiments, it is obvious that there are other variations and modifications which can be made without departing from the spirit and scope of the intention as more particularly set forth in the appended claims.

I claim:

1. A coating composition comprising:
    (i) 1–40 percent by weight of an imine which comprises the reaction product of 2 moles of isobutyraldehyde and one mole of isophorone diamine;
    (ii) 15–55 percent by weight of a polyisocyanate having an average of at least two isocyanate groups per molecule;
    (iii) 1–50 percent by weight of at least one polyaspartic ester;
    (iv) 1–20 percent by weight of an isocyanate functional urethane comprising the reaction product of:
        (a) an aliphatic polyisocyanate having an average of at least 2.1 isocyanate groups per molecule and selected from the group consisting of biurets and isocyanates of linear aliphatic diisocyanates; and
        (b) at least one monofunctional alcohol having a molecular weight less than about 500 and which is selected from the group consisting of:

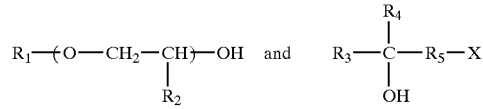

wherein n is from 1 to about 10; $R_1$ is an aliphatic radical of 1 to about 12 carbons; $R_2$ is H or $CH_3$; $R_3$ and $R_1$ are independently aliphatic of 1 to about 12 carbons or H; $R_5$ is an aliphatic radical of 1 to about 8 carbons or nothing; X is

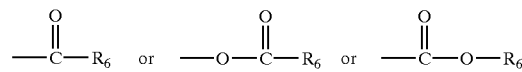

and $R_6$ is an aliphatic radical of 1 to about 12 carbons, and
        (c) at least one diol having the formula:

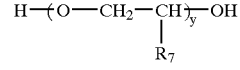

wherein $R_7$ is H or $CH_3$ and y is from 1 to about 40; wherein the total NCO/OH equivalents ratio is greater than 1.0 and the ratio of OH equivalents from (b) to OH equivalents from (c) ranges from 0.3:1 to 2.0:1.0; and
wherein (ii) is different from (iv) and the coating composition is substantially free of hydroxyl groups.

* * * * *

UNITED STATES PATENT AND TRADEMARK OFFICE
CERTIFICATE OF CORRECTION

PATENT NO.        : 6,828,405 B1
APPLICATION NO.   : 08/488019
DATED             : December 7, 2004
INVENTOR(S)       : Rubing Cai It is certified that error appears in the above-identified patent and that said Letters Patent is hereby corrected as shown below:

In the Claims

Column 10, Line 35, delete "$R_1$", insert --$R_4$--.

Signed and Sealed this
Ninth Day of February, 2016

Michelle K. Lee
*Director of the United States Patent and Trademark Office*